United States Patent [19]

Honda

[11] Patent Number: 5,029,586
[45] Date of Patent: Jul. 9, 1991

[54] IMAGE PROCESSING METHOD AND SYSTEM FOR RADIOLOGICAL DIAGNOSTICS

[75] Inventor: Michitaka Honda, Yaita, Japan

[73] Assignee: Kabushiki Kaisha Toshiba, Kawasaki, Japan

[21] Appl. No.: 333,397

[22] Filed: Apr. 5, 1989

[30] Foreign Application Priority Data

Apr. 11, 1988 [JP] Japan .................................. 63-88573

[51] Int. Cl.$^5$ .............................................. A61B 6/00
[52] U.S. Cl. ................................ 128/653 R; 128/654; 358/111; 364/413.23; 378/99
[58] Field of Search ................... 128/653 R, 654; 358/111; 378/99; 364/413.23

[56] References Cited

U.S. PATENT DOCUMENTS

| | | | |
|---|---|---|---|
| 4,335,307 | 6/1982 | DeVries et al. | 358/111 |
| 4,375,068 | 2/1983 | McBride | 358/111 |
| 4,639,867 | 1/1987 | Suzuki et al. | 358/111 |
| 4,813,061 | 3/1989 | Kakegawa | 378/99 |
| 4,837,796 | 6/1989 | Ema | 358/111 |

Primary Examiner—Francis Jaworski
Assistant Examiner—K. M. Pfaffle
Attorney, Agent, or Firm—Finnegan, Henderson, Farabow, Garrett, and Dunner

[57] ABSTRACT

An estimating circuit estimates the thickness of the subject appearing on a mask image, by using the value of the thickness of a uniform material equivalent to a subject, with respect to each pixel of the mask image, based on radiographic conditions and pixel density of each pixel. A correction coefficient table has correction coefficients corresponding to the thickness of the uniform material. One of the correction coefficients is selected from the correction coefficient table, based on the estimated thickness obtained from the estimating circuit. The selected correction coefficient and each pixel of the mask image are subjected to an arithmetic operation, thereby to produce a mask image in which influence due to beam-hardening effect is corrected. On the other hand, a suitable correction coefficient is selected from a correction coefficient table having correction coefficients corresponding to the thickness of the contrast medium, based on the estimated thickness of the image and on a subtraction image obtained by subtracting the mask image from a contrast image produced by irradiating radioactive rays onto the subject in which the contrast medium is injected. The selected correction coefficient and each pixel of the subtraction image are subjected to an arithmetic operation, thereby to obtain a mask image in which influence due to beam-hardening effect is corrected.

14 Claims, 16 Drawing Sheets

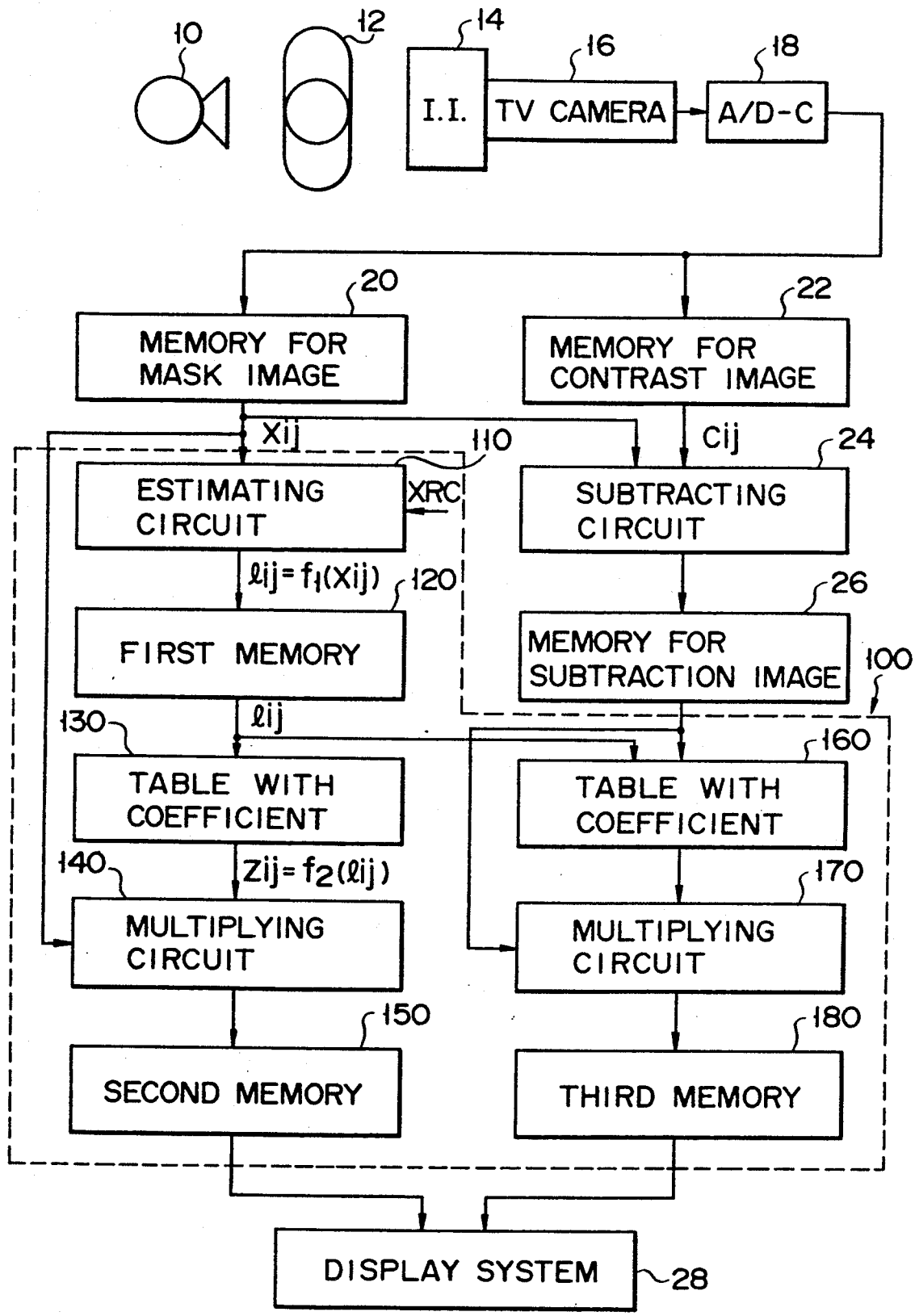
F I G. 1

| DATA \ KVP | 70 | 71 | 72 | --- |
|---|---|---|---|---|
| 0 | ∞ | ∞ | ∞ | |
| 1 | 100 | 101 | 102 | |
| 2 | 99 | 100 | 101 | |
| 3 | 97 | 98 | 99 | |
| 4 | 95 | 97 | 98 | |
| 5 | 93 | 91 | 90 | |

| 70 KVP | | 115 KVP | |
|---|---|---|---|
| WATER THICKNESS | CORRECTION VALUE | WATER THICKNESS | CORRECTION VALUE |
| 0 | — | 0 | — |
| 1 | 1.2 | 1 | 1.1 |
| 2 | 1.19 | 2 | 1.16 |
| ⋮ | ⋮ | ⋮ | ⋮ |
| 15 | 1.0 | 15 | 1.0 |
| ⋮ | ⋮ | ⋮ | ⋮ |
| 20 | 0.8 | 2.0 | 0.85 |
| ⋮ | ⋮ | ⋮ | ⋮ |

FIG. 9

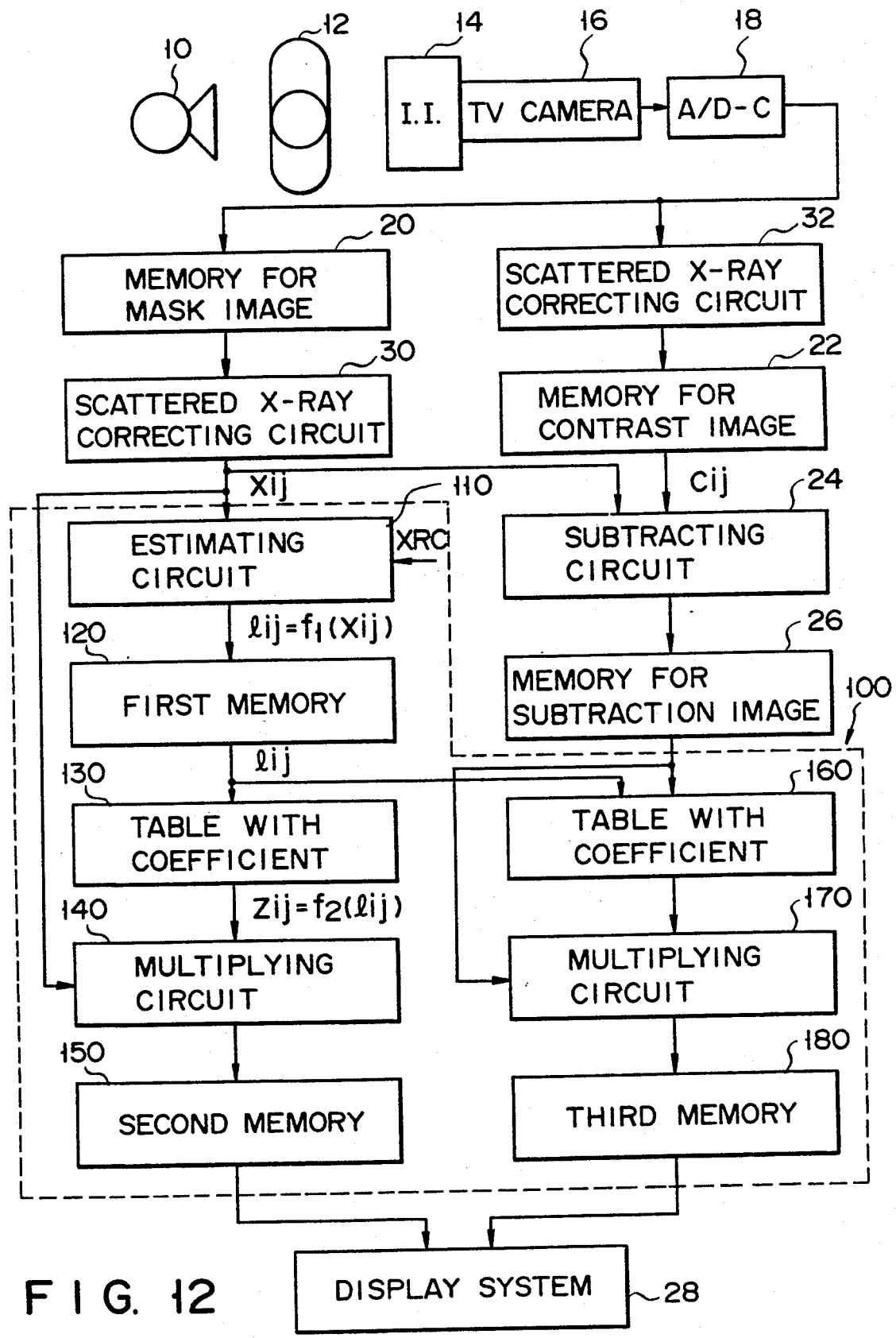
F I G. 12

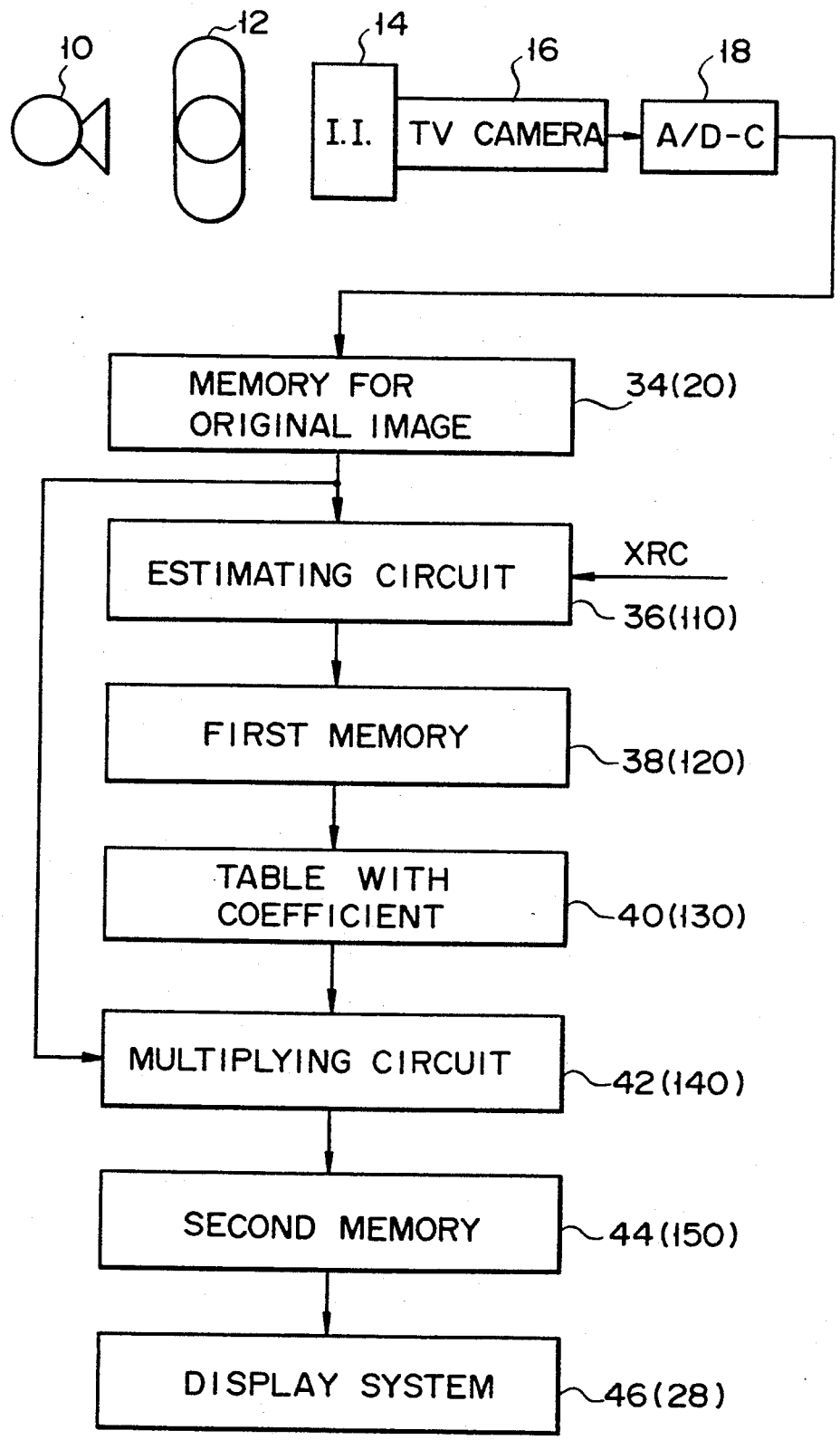
F I G. 13

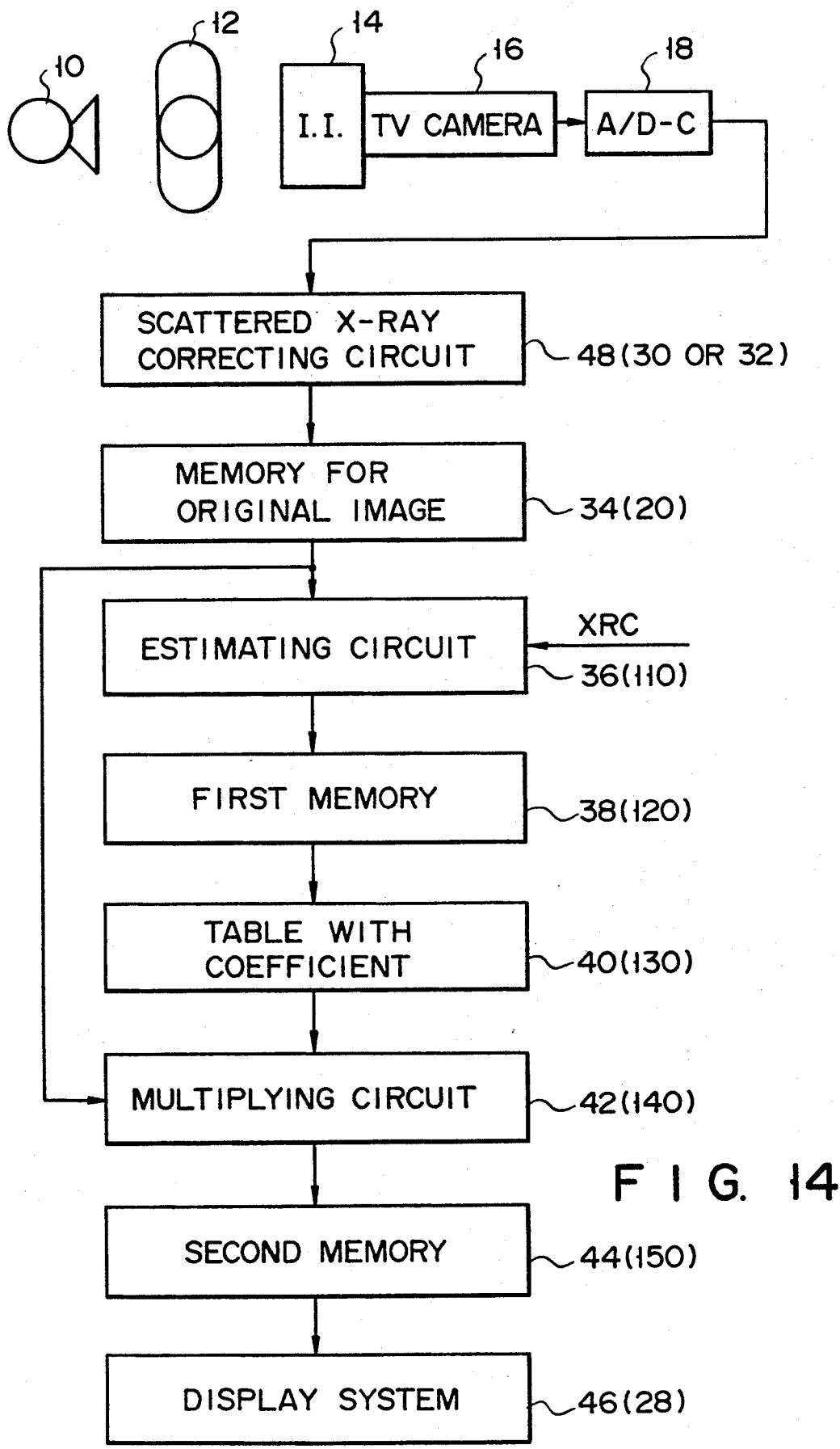
F I G. 14

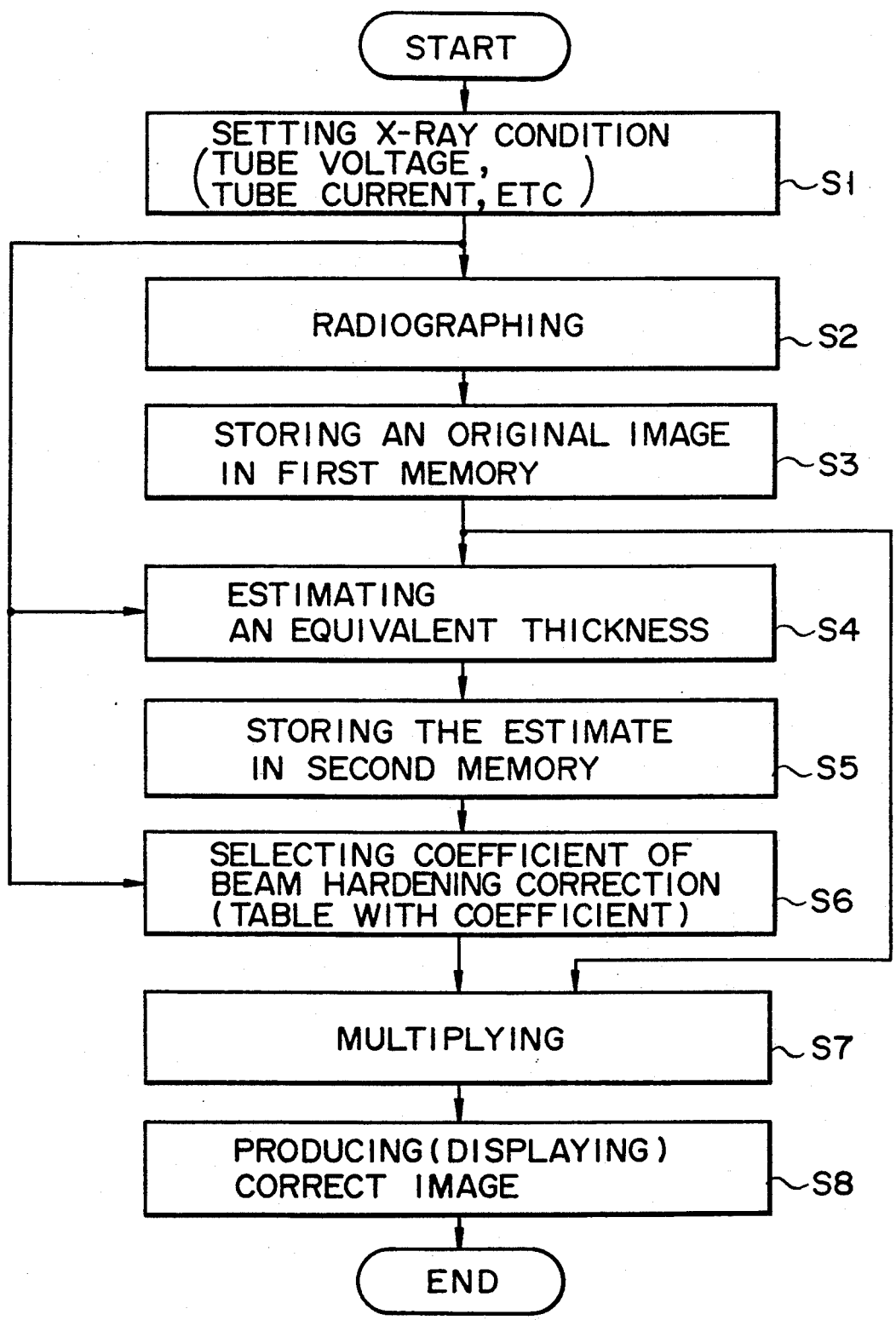
F I G. 16

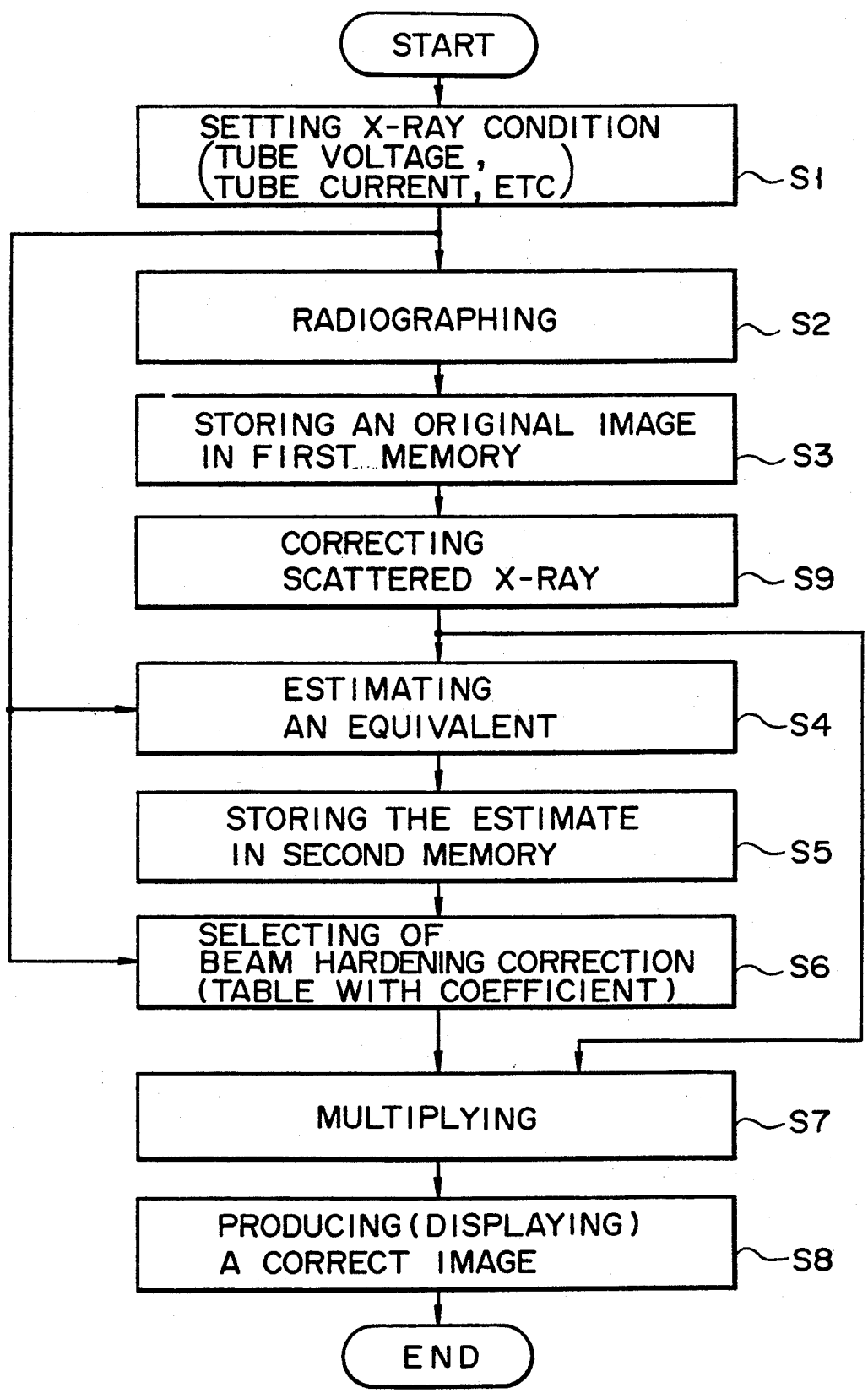
F I G. 18

_IMAGE PROCESSING METHOD AND SYSTEM FOR RADIOLOGICAL DIAGNOSTICS_

BACKGROUND OF THE INVENTION

1. Field of the Invention

The present invention relates to an image processing method and a system for radiological diagnostics, which employs an X-ray digital diagnosis image in order to enhance the precision of radiological diagnosis.

2. Description of the Related Art

As a conventional system for radiological diagnostics, a digital subtraction angiography (DSA) system has been well known. In the DSA system, a digital subtraction image can be obtained by using a mask image obtained without the use of a contrast medium and a contrast image obtained with the use of a contrast medium. With use of the DSA system, angiography or ventriculogram is performed, and a densitometry method is used, in order to image the diameter of a blood vessel or measure the volume of a ventricle. A radiographic image (hereinafter, referred to as "X-ray image" since the X-ray image is a typical radiographic image) obtained by this system is not precise, since it is mixed with X-ray measurement error beam components due to X-ray beams scattering on the subject and beam hardening effect.

Regarding these error components, a method of correcting error components due to X-ray beam scattering has been put into practice, the error components have been corrected satisfactorily. The beam hardening effect depends on the energy absorption coefficient of a material (subject), through which the beam passes, and a thickness of the material. Suppose that water is used as material. For example, when the water thickness is 10 cm, the mean absorption coefficient thereof is 0.25. On the other hand, when the water thickness is 15 cm, the mean absorption coefficient is 0.24. Therefore when the water thickness is 10 cm, the X-ray permeability is $e^{-0.25 \times 10}$, and when the water thickness is 15 cm, the X-ray permeability is $e^{-0.24 \times 10}$.

The mean absorption coefficient is changed by the beam hardening effect, in accordance with the change in water thickness. Thus, the relationship between the material thickness (water thickness) and the X-ray permeability is not linear. More specifically, the density of an obtained image of a part of the subject which has a larger thickness, for example, the chest, is not equal to the density of an image of another part. The beam-hardening effect adversely affects the measurement error of the density of X-ray images.

SUMMARY OF THE INVENTION

The object of the present invention is to provide an image processing method and a system for radiological diagnostics, wherein the density of an obtained radiographic image, which is adversely affected by beam-hardening effect, can be corrected, and the measurement precision of the obtained image improved.

This object can be achieved by an image processing system for radiological diagnostics, which comprises:

estimating means for estimating a first thickness of a subject appearing on a mask image obtained by irradiating radioactive rays onto the subject in which a contrast medium is not injected and by means of a second thickness of a uniform material equivalent to the subject, said second thickness being determined by radiographic conditions and pixel value of each pixel area;

a first coefficient table having correction coefficients corresponding to the thickness of said uniform material;

first selection means for selecting a suitable one of said correction coefficients from said first coefficient table, based on the estimated thickness obtained by said first estimating means;

first arithmetic operation means for performing an arithmetic operation on said selected correction coefficient selected by said first selection means and each pixel area of said mask image;

a second coefficient table having correction coefficients corresponding to the thickness of said contrast medium;

second selection means for selecting a suitable one of the correction coefficients from said second coefficient table, based on the estimated thickness obtained by said first estimating means and on a subtraction image obtained by subtracting said mask image from a contrast image produced by irradiating radioactive rays onto the subject in which the contrast medium is injected; and second arithmetic operation means for performing an arithmetic operation on said selected correction coefficient selected by said second selection means and each pixel of said subtraction image.

The object of the present invention can also be achieved by an image processing system for radiological diagnostics, comprising:

estimating means for estimating a first thickness of a subject appearing on an radiographic original image obtained by irradiating radioactive rays onto the subject and by means of a second thickness of a uniform material equivalent to the subject, said second thickness being determined by radiographic conditions and pixel value of each pixel area;

a coefficient table having correction coefficients corresponding to the thickness of said uniform material;

selection means for selecting a suitable one of said correction coefficients from said coefficient table, based on the estimated thickness obtained by said estimating means; and arithmetic operation means for performing an arithmetic operation on said selected correction coefficient selected by said selection means and each pixel area of said original image.

The object of the present invention can also be achieved by an image processing method for radiological diagnostics, comprising steps of:

estimating a first thickness of a subject appearing on an radiographic original image obtained by irradiating radioactive rays onto the subject and by means of a second thickness of a uniform material equivalent to the subject, said second thickness being determined by radiographic conditions and pixel value of each pixel area;

selecting a correction coefficient, based on the estimated thickness obtained in said estimating step; and performing an arithmetic operation on said selected correction coefficient and each pixel area of said original image.

According to the above system and method the thickness of a subject is estimated based on the image density and radiographic conditions, and a correction coefficient corresponding to the equivalent thickness of the subject is selected. Since the original image is multiplied by the correction coefficient corresponding to the thickness, the correction of the radiographic image density can be suitably corrected against the beam-hardening effect, and the measurement precision of the radiographic image density can be enhanced.

BRIEF DESCRIPTION OF THE DRAWINGS

FIG. 1 is a block diagram showing an embodiment of an image processing system for radiological diagnostics according to the present invention;

FIGS. 8A to 8D are views for explaining the operation of the system of FIG. 7, wherein FIG. 8A is a schematic view of a subject, FIG. 8B shows the relationship between the amount of X-rays and the position of an image before correction (e.g., a mask image), FIG. 8C shows the relationship between the position an image before correction (e.g., a mask image) and an equivalent water thickness, and FIG. 8D shows the relationship between the position of an image after correction (e.g., a mask image) and a correction coefficient (correction value);

FIG. 9 shows the arrangement of data on a table of correction coefficients applicable to a mask image;

FIGS. 10 to 12 are block diagrams showing modifications of the system of FIG. 7;

FIG. 13 is a block diagram showing still another embodiment of the image processing system for radiological diagnostics according to the present invention;

FIGS. 14 and 15 are block diagrams showing modifications of the system of FIG. 13;

FIG. 16 is a flow chart showing an embodiment of an image processing method for radiological diagnostics according to the present invention; and FIGS. 17 and 18 are flow charts showing modifications of the method of FIG. 16.

DETAILED DESCRIPTION OF THE PREFERRED EMBODIMENTS

Figures 2, 3:
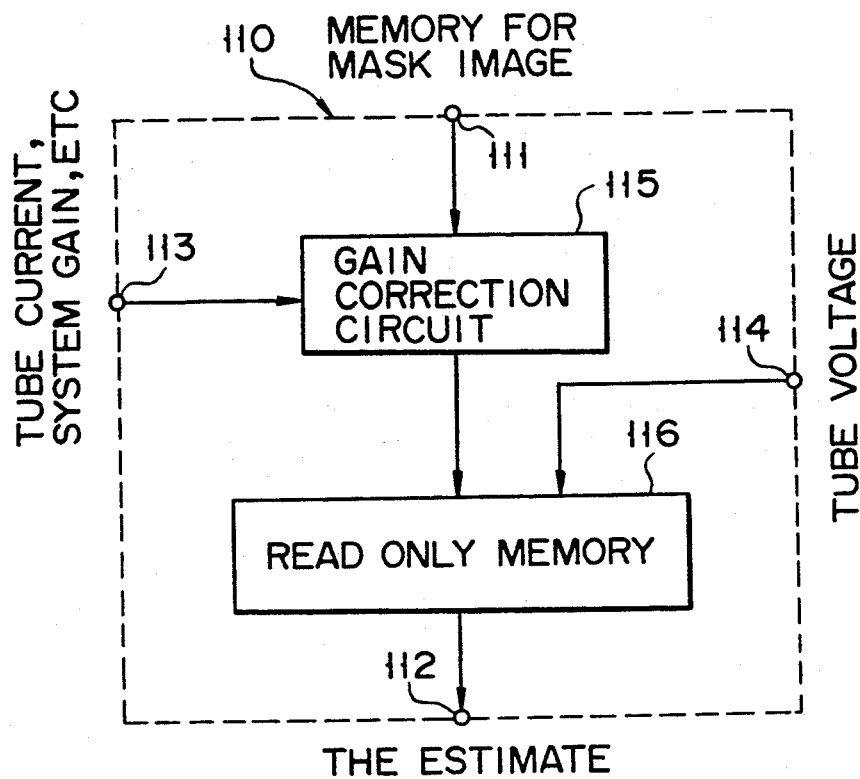
FIG. 2 is a block diagram showing in detail an estimating circuit used in the embodiment of FIG. 1.
FIG. 3 shows data items stored in a read-only memory shown in FIG. 2.

FIG. 1 is a block diagram showing an embodiment of an image processing system for radiological diagnostics according to the present invention. In FIG. 1, X-ray tube 10, which is typical means for generating radioactive rays, irradiates X-rays to subject 12. Image intensifier (I.I.) 14, which serving as a detector, detects X-rays transmitted through subject 12 and converts them to an optical signal TV camera 16 converts the optical signal to an analog TV image signal. Analog/digital converter (A/D-C) 18 converts the analog TV image signal to a digital TV image signal Memory 20 for mask image (hereinafter, referred to as "mask image memory 20") stores a mask image obtained by DSA (Digital Subtraction Angiography) in the state that a contrast medium is not used. Memory 22 for contrast image (hereinafter, referred to as "contrast image memory 22") stores a contrast image obtained by DSA in the state that the contrast medium is used. Subtracting circuit 24 receives the mask image and the contrast image and subjects them to logarithmic conversion and then to subtraction operation. Memory 26 for subtraction image stores a resultant subtraction image. Beam-hardening correction system 100 eliminates influence due to beam-hardening effect. The structure of beam-hardening correction system 100 is constituted as described below.

In beam-hardening correction system 100, estimating circuit 110 estimates an equivalent thickness of a subject. More specifically when the absorption coefficient of water is $\mu$, and the water thickness is l, the influence due to beam-hardening effect is given by $$\mu = B(l) \tag{1}$$

The absorption coefficient $\mu = B(l)$ is found in advance.

Estimating circuit 110 will now be described in detail with reference to FIGS. 2 and 3. Estimating circuit 110 comprises input terminal 111, output terminal 112, first control terminal 113, second control terminal 114, gain correction circuit 115, and read-only memory (ROM) 116. Gain correction circuit 115 receives a mask image supplied from mask image memory 20 through input terminal 111 performs gain correction for each pixel of the mask image, based on X-ray condition data such as tube current and system gain supplied through first control terminal 113, and outputs a resultant gain-corrected data. The gain-corrected data has, for example, density data of each pixel normalized under the condition that the tube current is 1 mA/1 sec, and the focus—I.I. distance is 100 cm.

ROM 116 receives gain-corrected data (pixel value) output from gain correction circuit 115 and the tube current applied to second control terminal 114 and selects data stored in advance in ROM 116 (example of the data is shown in FIG. 3). The selected data is output through output terminal 112. FIG. 3 shows data items stored in ROM 116, which relate to tube voltage (KVp).

Figure 4:
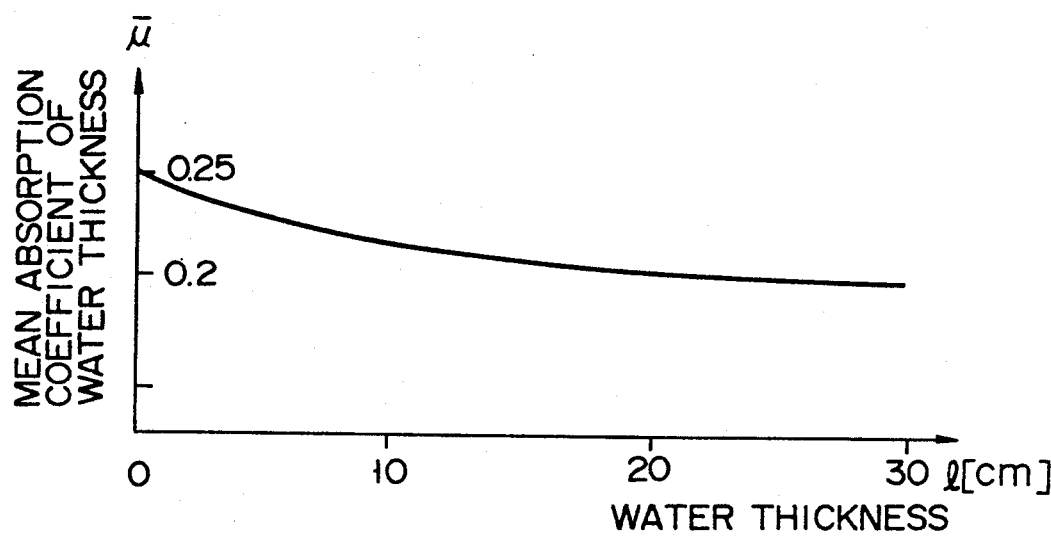
FIG. 4 is a graph showing a mean absorption coefficient of water in relation to the water thickness.
Figure 5:
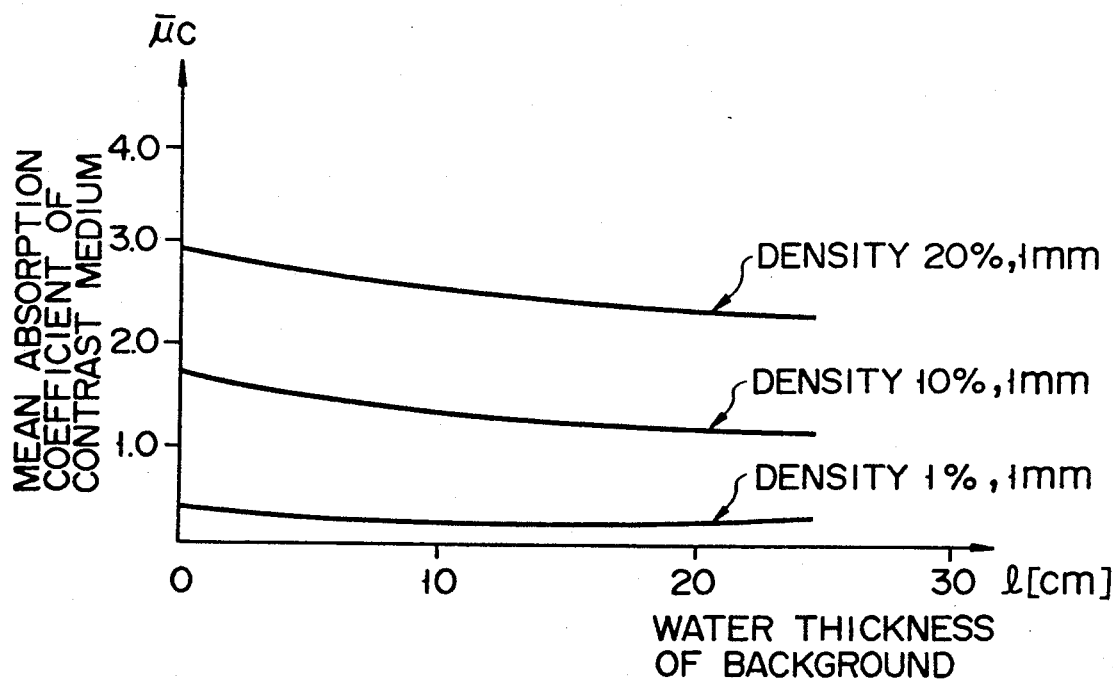
FIG. 5 is a graph showing mean absorption coefficients of contrast medium in relation to water thickness.

FIG. 4 is a graph showing a mean absorption coefficient $\mu$ of water in relation to water thickness lij. In the energy range employed in medical treatment, there is the tendency in which mean absorption coefficient $\mu$ decreases as water thickness lij increases, as shown in FIG. 4. When the water thickness (subject thickness) is lij, pixel density Xij of observed X-rays can be represented by $$X_{ij} = I_0 \cdot e^{-\mu \cdot l_{ij}} = I_0 \cdot e^{-B(l) \cdot l_{ij}} \tag{2}$$

In formula (2), $I_0$ can be estimated in advance from radiographic conditions. Thus, if a table showing data items of estimated water thickness lij in relation to pixel density Xij is prepared in advance, the equivalent water thickness lij can be obtained. The equivalent water thickness lij output from estimating circuit 110 is stored in first memory 120.

Table 130 with a correction coefficient for mask image prestores correction coefficient Zij corresponding to equivalent water thickness lij stored in first memory 120. Namely, correction coefficient table 130 stores the following value:

$$Zij = e^{-\mu \cdot s \cdot lij} / e^{-\mu \cdot lij} \quad (3)$$

In formula (3), symbol $\mu$ included in the denominator of formula (3) denotes a mean absorption coefficient which is obtainable after beam-hardening effect has occurred, and varies in accordance with thickness lij. Symbol $\mu s$ included in the numerator of formula (3) indicates a mean absorption coefficient serving as a reference value, for example, a mean absorption coefficient when water thickness is 10 cm. Correction coefficient Zij is a ratio of the X-ray attenuation, which is observed when beam-hardening effect has occurred, to the X-ray attenuation, which is observed when the beam-hardening effect has not occurred, with respect to equivalent water thickness lij. Multiplying circuit 140 multiplies correction coefficient Zij with original image value Xij to produce beam-hardening corrected mask image. This image is stored in second memory 150.

The structure of a system for eliminating the influence due to beam-hardening effect from the contrast image will now be described. Since the contrast image is obtained in the state wherein the contrast medium is used, the beam-hardening effect occurring in the contrast image is remarkably different from that occurring in the mask image. The estimation of thickness using equivalent water considerably degrates the measurement precision. In order to deal with this problem, table 160 showing the contrast image correction coefficient is used. The beam-hardening effect occurring in the contrast image obtained by using the contrast medium is influenced by the material existing behind the contrast medium and the contrast medium itself. Correction coefficient table 160 receives the subtraction image from subtraction image memory 26 and the equivalent thickness lij, and prestores the correction coefficient corresponding to these factors.

Value $\mu c$ is determined by water thickness $l$ of background water and $\mu c \cdot tc$. Mean absorption coefficient $\mu c$ is determined by the density of the employed contrast medium.

Figure 6:
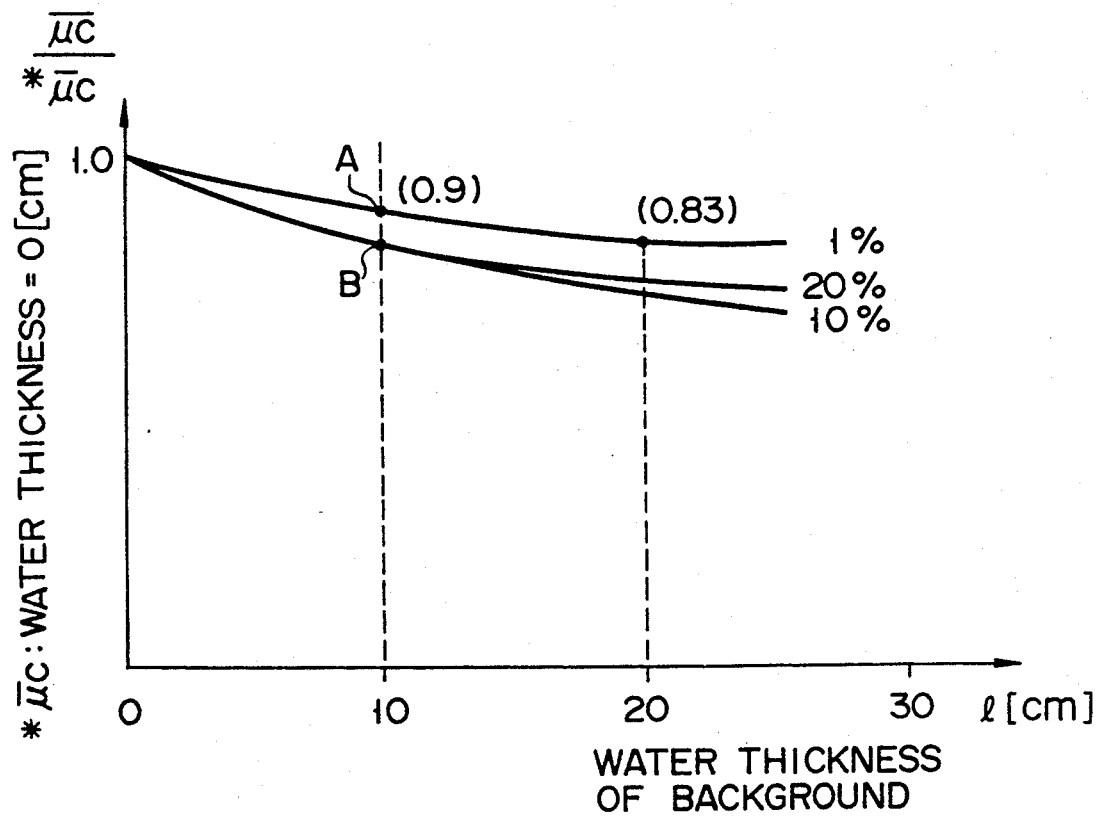
FIG. 6 shows the relationship between the background water thickness l and the normalized value obtained by normalizing the mean absorption coefficient $\mu c$ by use of the coefficient $*\mu c$ at the time when the background water thickness is 0 cm.

FIG. 6 shows the relationship between the background water thickness $l$ and the normalized value obtained by normalizing the mean absorption coefficient $\mu c$ by use of the coefficient $*\mu c$ at the time when the background water thickness is 0 cm. A reference absorption coefficient of the contrast medium is determined as in the aforementioned mask image processing. For example, the reference absorption coefficient is determined under the condition that the background water thickness is 10 cm (curves A and B in FIG. 6). Correction coefficient table 160 stores in advance correction coefficient $\mu c_{10}/\mu c$ so as to apply the contrast medium density (subtract image) Sij, obtained under water thickness lij, i.e., $$\begin{aligned} Sij &= \log Xij - \log Cij \\ &= \log(e^{-\mu \cdot lij}) - \log(e^{-\mu \cdot lij - \mu c \cdot tc}) \\ &= \mu c \cdot tc \end{aligned} \quad (4)$$

to the value $\mu c_{10} \cdot tc$ in the case where background water thickness is 10 cm. Multiplying circuit 170 multiplies the correction coefficient output from correction coefficient table 160 with the aforementioned subtraction image Sij, to produce a beam-hardening corrected subtraction image. This image is stored in third memory 180. The image stored in second memory 150 and the image stored in third memory 180 are displayed on display system 28.

The operation of the above system will now be described. Suppose that subject 12 is entirely formed of water. The beam-hardening correction processing for the mask image will be described at first. An X-ray signal affected by beam-hardening effect supplied from TV camera 16 is converted to a digital TV image signal and input to mask image memory 20. The pixel value (density) of a given pixel of the image stored in mask image memory 20 is represented by Xij. The X-ray pixel density Xij is input to estimating circuit 110. Thus, the equivalent thickness is estimated. The equivalent water thickness lij (lij=f(Xij)) given by formula (2) is supplied from estimating circuit 110 to first memory 120 for each pixel density. The equivalent water thickness lij is then read out from first memory 120 and delivered to correction coefficient table 130. The correction coefficient Zij of formula (3) corresponding to equivalent water thickness lij is referred to in correction coefficient table 130 and is output to multiplying circuit 140. Multiplying circuit 140 multiplies the correction coefficient Zij (original mask image) with the X-ray pixel density Xij, thereby to perform beam-hardening correction and obtain beam-hardening correction mask image 15. In other words, since the values obtained from formulae (1) and (2) are multiplied, the pixel density is represented by $$I_0 \cdot e^{-\mu s \cdot lij}$$

Since the mean absorption coefficient can be constantly set to the corrected reference value $\mu s$, the beam-hardening effect can be eliminated, and the measurement precision of the pixel density can be enhanced.

The beam-hardening correction processing for the contrast image will now be described. Subtracting circuit 24 subjects the mask image and the contrast image to logarithmic conversion so as to obtain a subtraction image $Sij = \log Xij - \log Cij$. An image of the part where the contrast medium is used is obtained from the subtraction image Sij, and is stored in subtraction image memory 26. The increase in the value of subtraction image Sij indicates that the product of mean absorption coefficient $\mu c$ of contrast medium and the thickness tc thereof increases accordingly. The subtraction image Sij (formula (4)) output from subtraction image memory 26 and the equivalent water thickness lij are input to correction coefficient table 160 for the subtraction image. In table 160, the corresponding correction coefficient $\mu c_{10}/\mu c$ is referred to. For example, when the background water thickness lij is 20 cm, as shown in FIG. 6, the contrast medium density (subtract image) Sij is 0.83·0.1 cm=0.083. The contrast medium density Sij is multiplied by 0.9/0.83 by correction coefficient table 160, and is corrected to 0.9×0.1=0.09. The correction coefficient $\mu c_{10}/\mu c$ and the subtract image $Sij = \mu c \cdot tc$ are multiplied by multiplying circuit 170, thereby to obtain a subtraction image in which the beam-hardening effect has been eliminated.

As a result, the subtraction image Sij can be represented by $\mu c_{10} \cdot tc$, and the mean absorption coefficient can constantly be corrected to reference value $\mu c$. Therefore, suitable density correction can be made against the beam-hardening effect, and the measurement precision of X-ray radiography can be enhanced.

Figure 7:
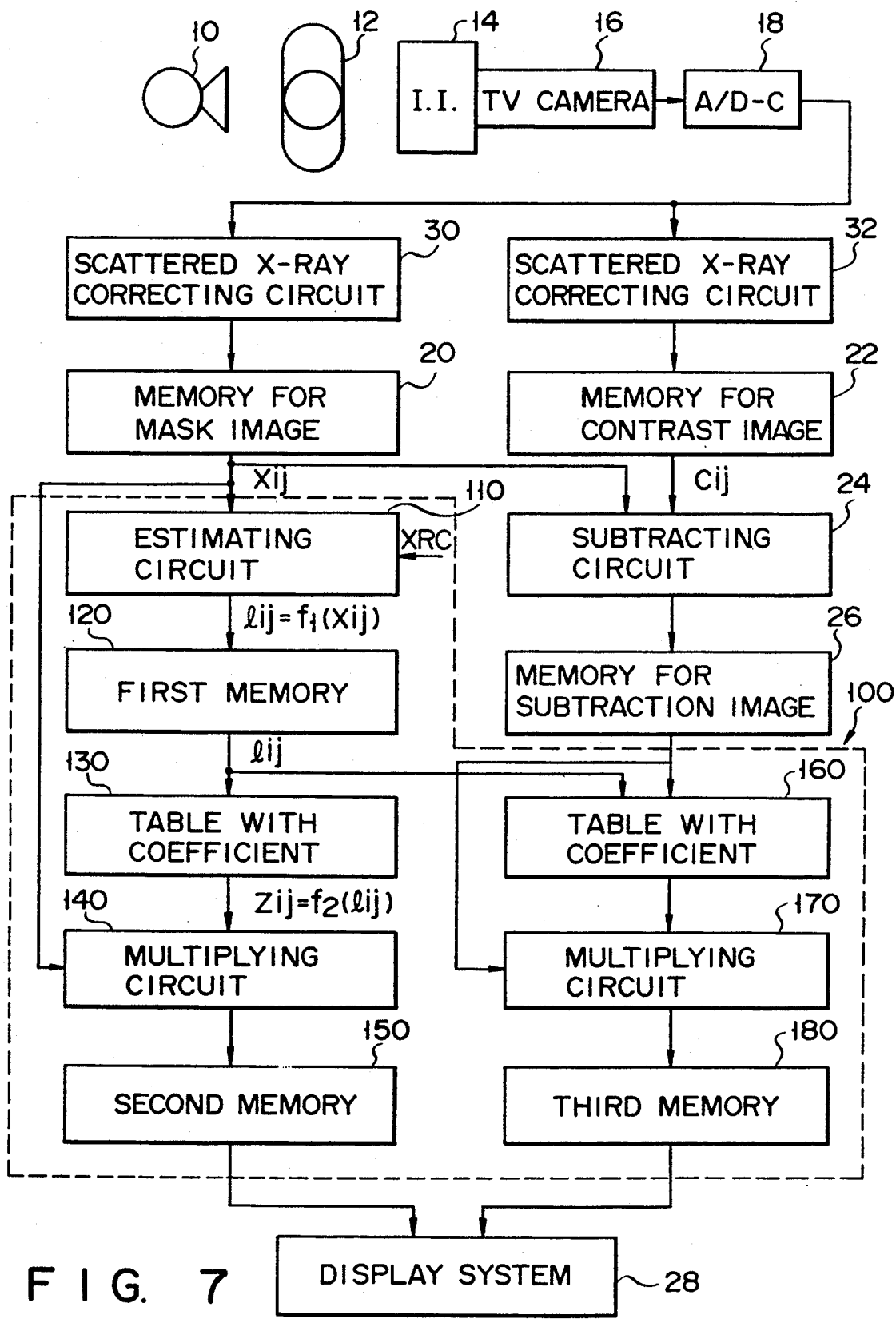
FIG. 7 is a block diagram showing another embodiment of the image processing system for radiological diagnostics according to the present invention.
Figure 8A:
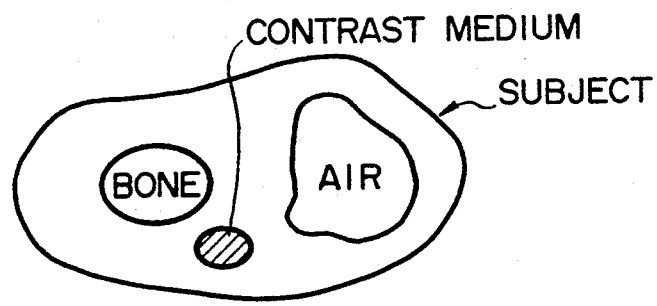
Figure 8B:
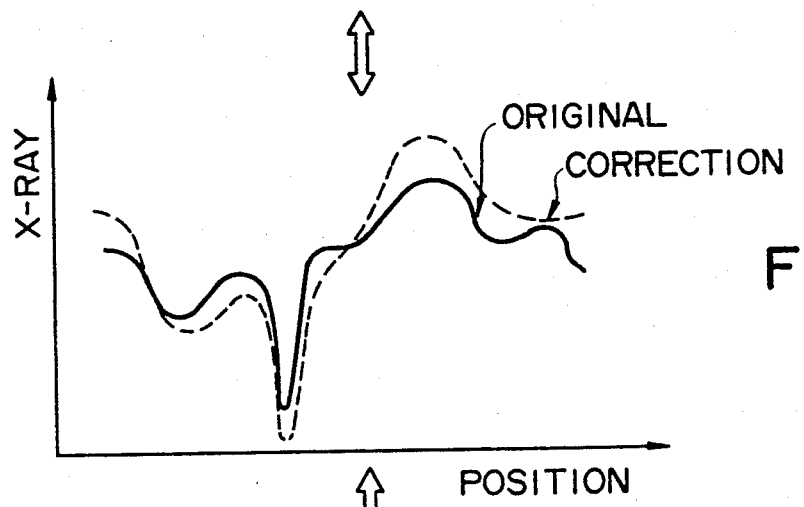
Figure 8C:
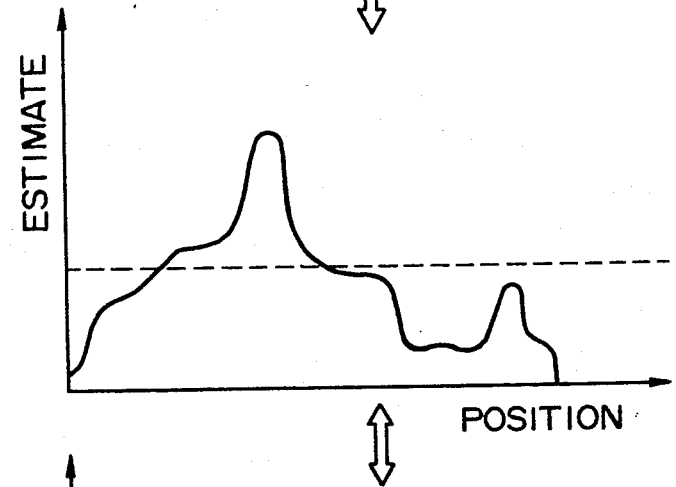
Figure 8D:
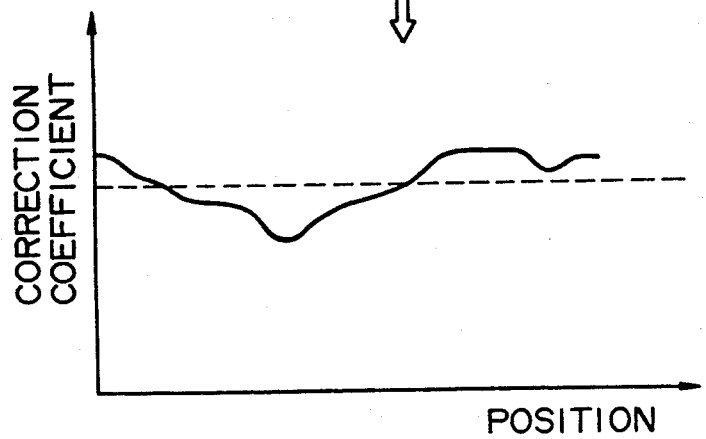

The present invention is not limited to the above-described embodiment. For example, the measurement precision can be further improved by providing a step of scattered X-ray correction as a pre-process prior to the beam-hardening correction. This system will now be described with reference o FIGS. 7 to 12. In FIG. 7, in addition to the structure of FIG. 1, scattered X-ray correcting circuit 30 is provided in front of mask image memory 20, and also another scattered X-ray correcting circuit 32 is provided in front of contrast image memory 22. According to the structure of FIG. 7, a mask image and a contrast image in which the correction of scattered X-ray has been made can be obtained. As a result, the measurement precision can be more improved than in the structure of FIG. 1. For example, X-rays are irradiated under given radiographic conditions onto a soft-structure subject, which is substantially made of water, as shown in FIG. 8A. Then, an original image before correction (e.g., mask image) can be obtained, as shown in FIG. 8B. Also, as shown in FIG. 8C, the equivalent water thickness is estimated and an original image before correction (e.g., mask image) can be obtained. Thereafter, beam-hardening correction is made, and a corrected image (e.g., mask image) can be obtained, as shown in FIG. 8D.

FIG. 9 shows the arrangement of data on a table of correction coefficients applicable to a mask image. When water thickness is 15 cm, the correction value is 1.0, which is a function of the tube voltage (KVp) and the water thickness. In this case, it is supposed that the Al thickness and the CSI thickness of the radiographic system are constant.

Figure 10:
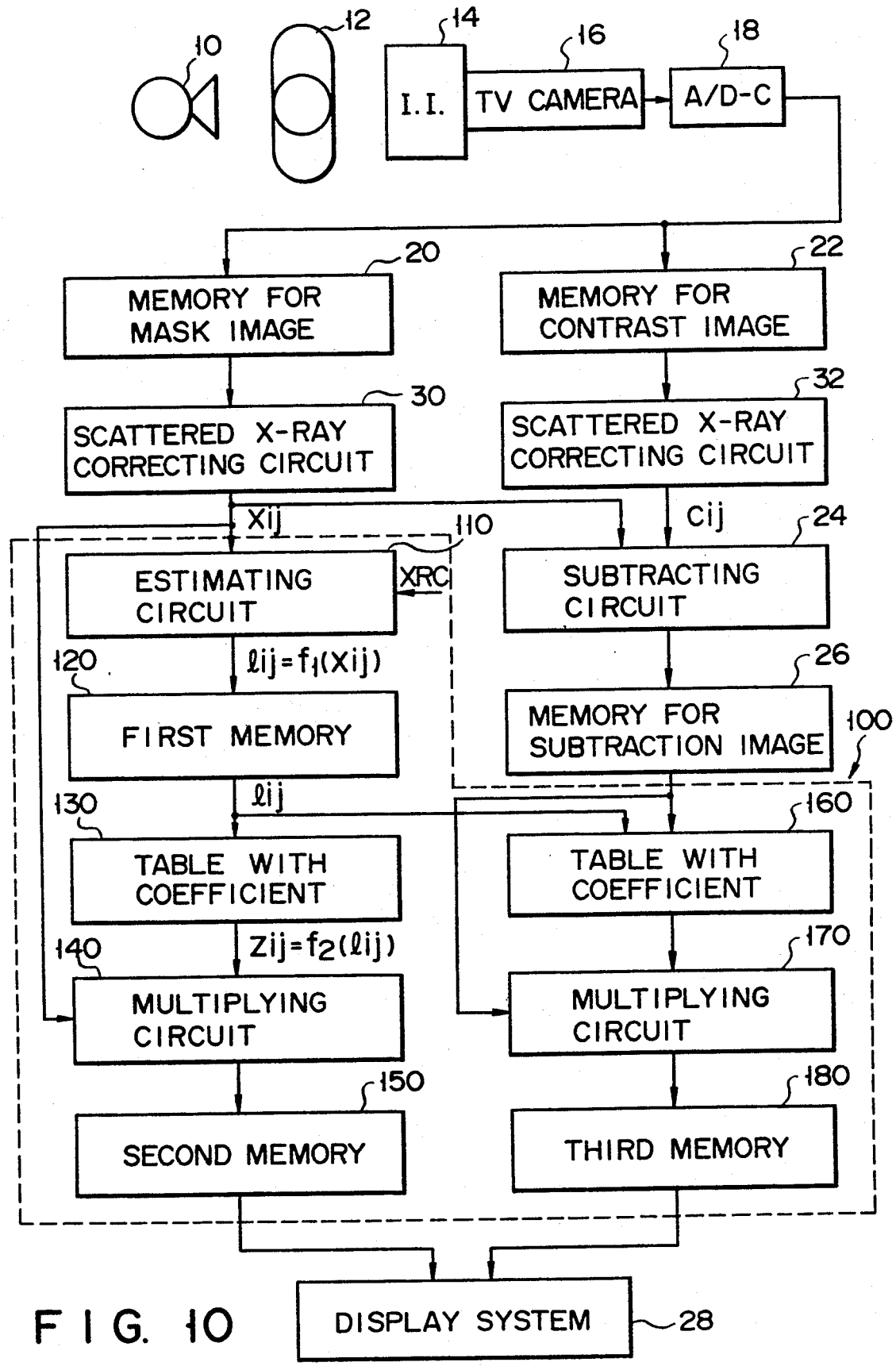
Figure 11:
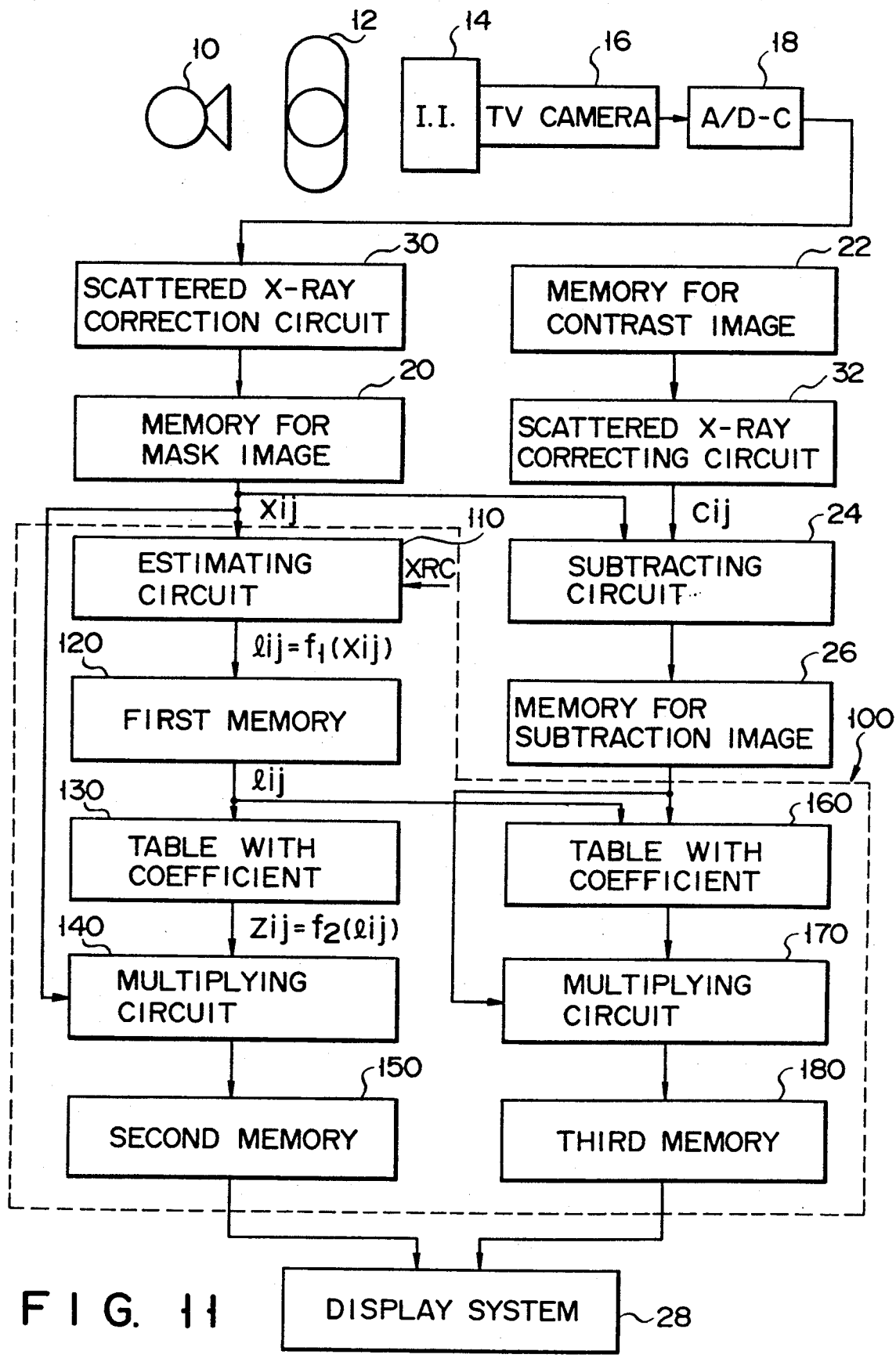

FIGS. 10 to 12 shows modifications of the system of FIG. 7.

In the system of FIG. 10, scattered X-ray correcting circuit 30 is provided in rear of mask image memory 20, and another scattered X-ray correcting circuit 32 is provided in rear of contrast image memory 22.

In the system of FIG. 11, scattered X-ray correcting circuit 30 is provided in front of mask image memory 20, and another scattered X-ray correcting circuit 32 is provided in rear of contrast image memory 22.

In the system of FIG. 12, scattered X-ray correcting circuit 30 is provided in rear of mask image memory 20, and another scattered X-ray correcting circuit 32 is provided in front of contrast image memory 22.

The above embodiment has been applied to the digital subtraction angiography (DSA), but it is applicable to normal X-ray radiography, as shown in FIG. 13. The system of FIG. 13 employs a mask image processing system equivalent to that of the system of FIG. 1. More specifically, an output of A/D-C 18 is input to original image memory 34 (corresponding to mask image memory 20 in FIG. 1). This system includes estimating circuit 36 (110 in FIG. 1), first memory 38 (120), coefficient table 40 (130), multiplying circuit 42 (140), second memory 44 (150) and display system 46 (28). The measurement precision of this system can be further improved by providing a scattered X-ray correction system as a pre-processing system, in addition to the beam-hardening correction system. The system with this pre-processing system will now be described with reference to FIGS. 14 and 15.

The system of FIG. 14 is realized by modifying the system of FIG. 13 such that scattered X-ray correcting circuit 48 (30 or 32 in FIG. 7) is provided in front of original image memory 34. As a result, an image in which scattered X-ray is corrected is obtained, and higher precision can be achieved than the system of FIG. 1.

Figure 15:
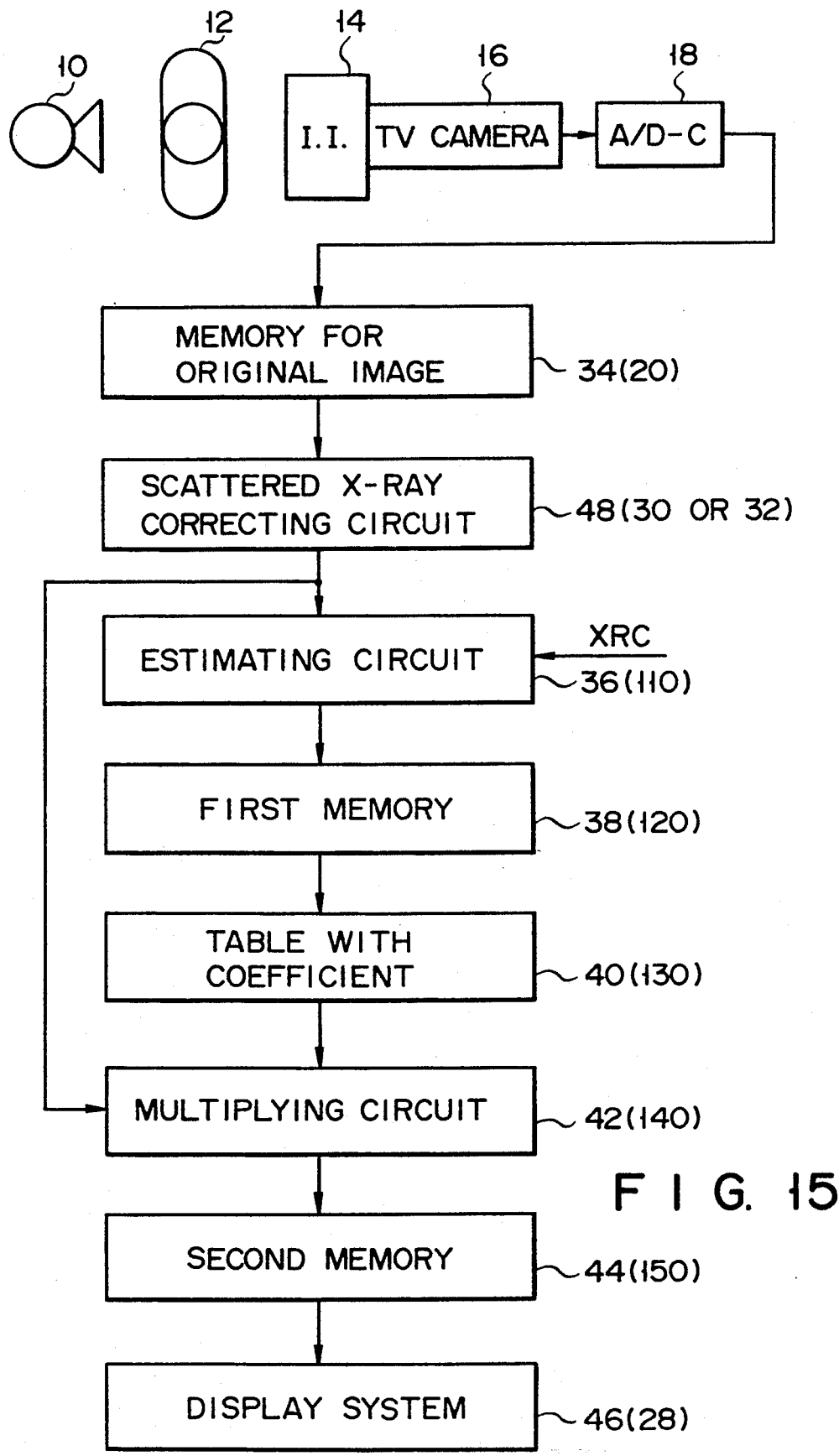

The system of FIG. 15 is realized by modifying the system of FIG. 13 such that scattered X-ray correcting circuit 48 (30 or 32 in FIG. 7) is provided in rear of original image memory 34.

FIG. 16 is a flow chart showing an embodiment of an image processing method for radiological diagnostics according to the present invention. In step S1, X-ray conditions (XRC) such as a tube voltage, a tube current, etc. are set. In step S2, radiographing is performed. In step S3, a radiographed original image is stored in the first memory in the form of a digital signal. In step S4, the equivalent water thickness of the subject on the original image is estimated in like manner as described above. In step S5, the equivalent water thickness is stored in the second memory. In step S6, the correction coefficient table is referred to, in like manner as described above, and a suitable correction coefficient is selected. In step S7, the original image is multiplied by the correction coefficient for each pixel of the image. In step S8, an image in which beam-hardening correction has been made by the multiplying operation can be obtained and displayed.

If a scattered X-ray correction step is provided in the above method, in addition to the beam-hardening correction step, the measurement precision can be further enhanced. This modified method will now be described with reference to FIGS. 17 and 18.

Figure 17:
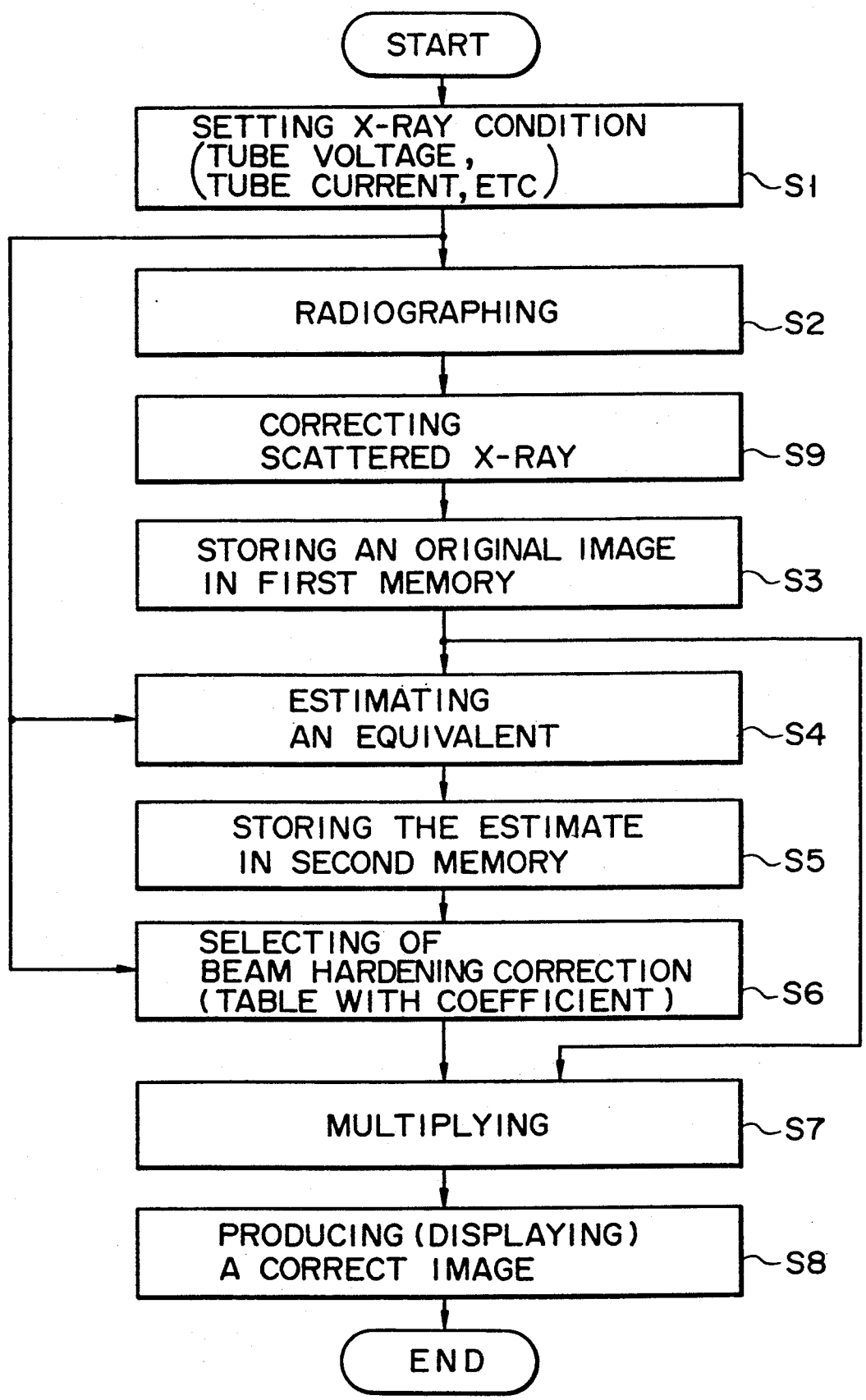

The method of FIG. 17 is obtained by modifying the method of FIG. 16, such that step S9 for correcting scattered X-rays is provided prior to step S3 for storing the original image in the first memory. According to this method, the scattered X-rays can be corrected, and the measurement precision can be more enhanced than in the method of FIG. 16.

The method of FIG. 18 is obtained by modifying the method of FIG. 16, such that step S9 for correcting scattered X-rays is provided after step S3 for storing the original image in the first memory.

Needless to say, other modifications can be made to the present invention, within the spirit of the subject matter of the invention.

As described above, according to the present invention, the water (subject) thickness is estimated based on the density of an image and radiographic conditions, and the correction coefficient corresponding to the equivalent thickness of the subject is selected. Since the original image is multiplied by the correction coefficient corresponding to the equivalent thickness, the radiographic image density can be suitably corrected against the beam-hardening effect, and the measurement precision of the radiographic image density can be enhanced.

What is claimed is:

1. An image processing system for radiological diagnostics, comprising:
   mask image memory means for storing a mask image obtained by irradiating, under a specific irradiation condition, radioactive rays onto a subject in which a contrast medium is not injected;
   correction means for correcting, under said irradiation condition, density values of pixels of said mask image stored in the mask image memory means, said correction means comprising:
   an estimating means, including memory means for storing thickness data of a specific uniform material corresponding to the density values of the pixels in the form of a first correction coefficient table, means for receiving the corrected density values of pixels and a value indicative of the irradiation condition, and for indexing said memory means for selecting data elements in the stored data for all pixels of the mask image based upon said received values, and means for estimating the thickness of the subject appearing on the mask image as a value calculated in terms of said specific uniform material;

correction coefficient memory means for storing correction coefficients based on radiation attenuation, and for outputting, as correction data, one of said correction coefficients which corresponds to the estimated value of the thickness of the subject;

a first arithmetic operation means for performing an arithmetic operation on the basis of said corrected density values stored in the first correction coefficient table and all pixels of the mask image stored in the mask image memory means, thereby obtaining a mask image having a reduced beam hardening effect;

contrast image memory means for storing a contrast image obtained by irradiating, under a specific irradiation condition, radioactive rays onto said subject in which the contrast medium was injected;

subtracting means for performing a subtraction operation on the basis of the contrast image stored in the contrast image memory means and the mask image stored in the mask image memory means, with respect to all pixels of both images, thereby obtaining a subtraction image;

a second correction coefficient table for storing correction coefficients based on irradiation attenuation, one of said correction coefficients being selected in accordance with the estimated value obtained by said estimating means and the subtraction value obtained by the subtracting means, and the selected correction coefficient being output as correction data;

second arithmetic operation means for performing an arithmetic operation on the basis of the correction data output from the second correction coefficient table and said subtraction image with respect to all pixels of the contrast image, thereby obtaining a contrast image having a reduced beam hardening effect; and display means for displaying at least one of the mask image and the contrast image having the reduced beam hardening effects, which have been output from said first and second arithmetic operation means.

2. The system according to claim 1, wherein scattered-ray correcting means are provided for correcting scattered ray components included in said mask image.

3. The system according to claim 1, wherein scattered-ray correcting means are provided for correcting scattered ray components included in said contrast image.

4. The system according to claim 1, wherein said uniform material is water.

5. The system according to claim 1, wherein the arithmetic operation performed by said first arithmetic operation means is a multiplication operation.

6. The system according to claim 1, wherein the arithmetic operation performed by said second arithmetic operation means is a multiplication operation.

7. An image processing system for radiological diagnostics, comprising:

image memory means for storing an image obtained by irradiating, under a specific irradiation condition, radioactive rays onto a subject;

correction means for correcting, under said irradiation condition, density values of pixels of said image stored in the image memory means;

an estimating means, including memory means for storing thickness data of a specific uniform material corresponding to the density values of the pixels in the form of a correction coefficient table, means for receiving the corrected density values of pixels and a value indicative of the irradiation condition, and for indexing said memory means for selecting data elements in the stored data for all pixels of a mask image based on said received values, and means for estimating the thickness of the subject appearing on the mask image as a value calculated in terms of said specific uniform material;

correction coefficient memory means for storing correction coefficients based on radiation attenuation, and for outputting, as correction data, one of said correction coefficients which corresponds to the estimated value of the thickness of the subject;

arithmetic operation means for performing an arithmetic operation on the basis of said corrected density values stored in the correction coefficient table and all pixels of the image stored in the image memory means, thereby obtaining an image having a reduced beam hardening effect; and display means for displaying the image having the reduced beam hardening effect, which has been output from said arithmetic operation circuit.

8. The system according to claim 7, wherein scattered-ray correcting means are provided for correcting scattered ray components included in said image obtained by irradiating.

9. The system according to claim 7, wherein said uniform material is water.

10. The system according to claim 7, wherein the arithmetic operation performed by said arithmetic operation means is a multiplication operation.

11. An image processing method for radiological diagnostics, comprising:

a first step of obtaining an image by irradiating, under a specific irradiation condition, radioactive rays onto a subject;

a second step of correcting, under said irradiation condition, density values of pixels of said image obtained in the first step;

a third step of selecting, when the corrected density values of pixels and the irradiation condition are given as index values, one data element representative of the thickness of a specific uniform material, said one data element corresponding to the density value of each of pixels stored in a table, and estimating, when the data selection has been performed on all said pixels of a mask image, the thickness of the subject appearing on said mask image as a value calculated in terms of said specific uniform material;

a fourth step of outputting, as correction data, one correction coefficient based on radiation attenuation, when an estimated value obtained in the third step is given;

a fifth step of performing an arithmetic operation on the basis of the correction data obtained in the fourth step and all pixels of the image obtained in the first step, thereby obtaining an image having a reduced beam hardening effect; and a sixth step of displaying the image having the reduced beam hardening effect, which has been obtained in the fifth step.

12. The method according to claim 11, wherein a step of correcting scattered ray components included in said image obtained by irradiating is performed prior to said third step.

13. The method according to claim 11, wherein said uniform material is water.

14. The method according to claim 11, wherein the arithmetic operation performed by said arithmetic operation is a multiplication operation.

* * * * *